US 11,447,084 B2

United States Patent
Ito et al.

(10) Patent No.: US 11,447,084 B2
(45) Date of Patent: Sep. 20, 2022

(54) VEHICLE CONTROL DEVICE, VEHICLE CONTROL METHOD AND PROGRAM

(71) Applicant: HONDA MOTOR CO., LTD., Tokyo (JP)

(72) Inventors: Osamu Ito, Wako (JP); Hiroshi Akaba, Wako (JP); Hidetoshi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 16/496,512

(22) PCT Filed: Mar. 29, 2017

(86) PCT No.: PCT/JP2017/012813
§ 371 (c)(1),
(2) Date: Sep. 23, 2019

(87) PCT Pub. No.: WO2018/179118
PCT Pub. Date: Oct. 4, 2018

(65) Prior Publication Data
US 2020/0377047 A1 Dec. 3, 2020

(51) Int. Cl.
*B60R 21/013* (2006.01)
*B60N 2/14* (2006.01)
(Continued)

(52) U.S. Cl.
CPC .............. *B60R 21/013* (2013.01); *B60N 2/14* (2013.01); *B60R 21/01554* (2014.10); *B60R 2021/0006* (2013.01); *B60R 2021/01013* (2013.01)

(58) Field of Classification Search
None
See application file for complete search history.

(56) References Cited

U.S. PATENT DOCUMENTS 9,981,622 B2 * 5/2018 Ohmura ................. G01C 21/34
10,730,476 B2 * 8/2020 Akaba ..................... B60R 22/48
(Continued)

FOREIGN PATENT DOCUMENTS

| CN | 1663851 | 9/2005 |
|---|---|---|
| CN | 1769099 | 5/2006 |

(Continued)

OTHER PUBLICATIONS

International Search Report and Written Opinion for International Application Serial No. PCT/JP2017/012813 dated May 30, 2017, 6 pages.

(Continued)

*Primary Examiner* — Aniss Chad
*Assistant Examiner* — Mahmoud M Kazimi
(74) *Attorney, Agent, or Firm* — Amin, Turocy & Watson, LLP

(57) ABSTRACT

The present invention is a vehicle control device including a restriction unit configured to restrict a change in an orientation of a vehicle seat, a vehicle information recognition unit configured to recognize information of a traveling environment of a vehicle, a risk evaluation unit configured to evaluate a risk of a collision which may occur in the vehicle on the basis of the traveling environment recognized by the vehicle information recognition unit, and a control unit configured to control the restriction unit and restrict the change in the orientation of the vehicle seat on the basis of a level of the risk of the collision evaluated by the risk evaluation unit.

9 Claims, 9 Drawing Sheets

(51) Int. Cl.
   *B60R 21/015*   (2006.01)
   *B60R 21/00*    (2006.01)
   *B60R 21/02*    (2006.01)
   *B60R 21/01*        (2006.01)

(56)                References Cited

U.S. PATENT DOCUMENTS

| | | |
|---|---|---|
| 2006/0076760 A1 | 4/2006 | Itoga |
| 2011/0018324 A1 | 1/2011 | Horiguchi et al. |
| 2016/0272141 A1* | 9/2016 | Ohmura .............. B60R 21/0134 |
| 2017/0225618 A1* | 8/2017 | Tanaka ................... B60Q 9/008 |
| 2018/0229636 A1* | 8/2018 | Minato .................. B60N 2/919 |
| 2018/0284789 A1* | 10/2018 | Oguro ............... B60W 50/0097 |

FOREIGN PATENT DOCUMENTS

| | | | | |
|---|---|---|---|---|
| EP | 1568549 | | 8/2005 | |
| JP | 10-129405 | | 5/1998 | |
| JP | 2001-163183 | | 6/2001 | |
| JP | 2005-335586 | | 12/2005 | |
| JP | 2005335586 A | * | 12/2005 | ......... B60N 2/42736 |
| JP | 2006-292681 | | 10/2006 | |
| JP | 2016-175513 | | 10/2016 | |
| WO | 2008-032475 | | 3/2008 | |

OTHER PUBLICATIONS

Japanese Office Action for Japanese Patent Application No. 2019-508410 dated May 12, 2020.
Chinese Office Action for Chinese Patent Application No. 201780088738.X dated May 6, 2021.

* cited by examiner

FIG. 6

ROAD INFORMATION 200

| TYPE OF ROAD | NUMBER OF LANES | LINEARITY | GRADIENT | PLACE |
|---|---|---|---|---|
| EXPRESSWAY | 1 | STRAIGHT LINE | −3 | URBAN AREA |
| TOLL ROAD | 2 | RIGHT CURVE | −2 | RESIDENTIAL AREA |
| BYPASS | 3 | LEFT CURVE | −1 | SUBURB |
| GENERAL ROAD | 4 | INTERSECTION | 0 | FARMLAND |
| ... | 5 | WINDING | 1 | MOUNTAIN |
| | 6 | ... | 2 | ... |
| | | | 3 | |

FIG. 7

REAL-TIME INFORMATION 201

| ROAD TRAFFIC INFORMATION | HAZARD MAP | WEATHER INFORMATION |
|---|---|---|
| NO | VEHICLE ACCIDENT | SUNNY |
| ACCIDENT | ACCIDENT CAUSING INJURY OR DEATH | RAIN |
| DELAY | SELF-INFLICTED ACCIDENT | SNOW |
| CONGESTION | SLIP | TYPHOON |
| CONSTRUCTION WORK | FALLING ROCK | STRONG WIND |
| SINKING | NO | HAIL |
| ... | ... | EARTHQUAKE |
| | | TSUNAMI |
| | | ... |

FIG. 8

EXTERNAL RECOGNITION INFORMATION 202

| EXTERNAL ENVIRONMENT | |
|---|---|
| PARKED VEHICLES | 5 |
| TRAVELING VEHICLES | 6 |
| PEDESTRIANS | 3 |
| TREES | 1 |
| BUILDINGS | 5 |
| GUARDRAILS | 3 |
| ... | |

FIG. 9

TRAVELING INFORMATION 203

| TRAVELING STATE | PITCH | ROLL | YAW |
|---|---|---|---|
| STOP | -3 | -3 | -3 |
| LOW SPEED | -2 | -2 | -2 |
| MEDIUM SPEED | -1 | -1 | -1 |
| HIGH SPEED | 0 | 0 | 0 |
| ACCELERATION | 1 | 1 | 1 |
| DECELERATION | 2 | 2 | 2 |
| ACCELERATION/ DECELERATION | 3 | 3 | 3 |

FIG. 10

| ROAD INFORMATION | TYPE OF ROAD: GENERAL ROAD | NUMBER OF LANES: 2 | LINEARITY: STRAIGHT LINE | GRADIENT: 1 | PLACE: URBAN AREA | |
|---|---|---|---|---|---|---|
| REAL-TIME INFORMATION | ROAD TRAFFIC INFORMATION: CONGESTION | HAZARD MAP: VEHICLE ACCIDENT | WEATHER INFORMATION: RAIN | | | |
| EXTERNAL RECOGNITION INFORMATION | PARKED VEHICLES: 5 | TRAVELING VEHICLES: 6 | PEDESTRIANS: 3 | TREES :1 | BUILDINGS :5 | GUARDRAILS :3 |
| TRAVELING INFORMATION | SPEED STATE: MEDIUM SPEED | PITCH: 1 | ROLL: 0 | YAW: 0 | | |

VEHICLE CONTROL DEVICE, VEHICLE CONTROL METHOD AND PROGRAM

TECHNICAL FIELD

The present invention relates to a vehicle control device, a vehicle control method, and a program.

BACKGROUND ART

In recent years, there have been vehicles with a seat arrangement in which rotation or the like is possible in a horizontal direction. Occupants of such vehicles may change a seat reclining angle or a seat direction and get into the vehicles in states of various seat arrangements. Patent Document 1 describes technology for rotating a vehicle seat.

CITATION LIST

Patent Literature

[Patent Document 1]
PCT International Publication No. WO/2008/032475

SUMMARY OF INVENTION

Technical Problem

However, occupant protection devices such as seat belts and airbags are mainly designed to protect occupants when vehicles collide in a forward direction. Accordingly, it is desired that the occupant protection devices sufficiently perform occupant protection with respect to vehicles in which it is possible to rotate a seat and change an orientation of the seat.

The present invention has been made in view of such circumstances and an objective of the present invention is to provide a vehicle control device, a vehicle control method, and a program capable of sufficiently protecting an occupant using an occupant protection device.

Solution to Problem

According to the invention (1), there is provided a vehicle control device including: a restriction unit configured to restrict a change in an orientation of a vehicle seat; a vehicle information recognition unit configured to recognize information of a traveling environment of a vehicle; a risk evaluation unit configured to evaluate a risk of a collision which may occur in the vehicle on the basis of the traveling environment recognized by the vehicle information recognition unit; and a control unit configured to control the restriction unit and restrict the change in the orientation of the vehicle seat on the basis of a level of the risk of the collision evaluated by the risk evaluation unit.

According to the invention (2), in the vehicle control device according to the invention (1), the control unit is configured to restrict the orientation of the vehicle seat to an orientation in which an occupant protection state is secured by an airbag when the risk of the collision is high.

According to the invention (3), in the vehicle control device according to the invention (1) or (2), the risk evaluation unit is configured to evaluate the risk of the collision in stages on the basis of the traveling environment and the control unit is configured to restrict the change in the orientation of the vehicle seat on the basis of a stage of the risk of the collision.

According to the invention (4), in the vehicle control device according to any one of the inventions (1) to (3), the risk evaluation unit is configured to evaluate the risk of the collision on the basis of a place where the vehicle travels.

According to the invention (5), in the vehicle control device according to the invention (4), the risk evaluation unit is configured to estimate a direction of the collision which may occur in the vehicle on the basis of the traveling environment and the control unit is configured to control the restriction unit and restrict the change in the orientation of the vehicle seat on the basis of the collision direction.

According to the invention (6), in the vehicle control device according to the invention (5), the control unit is configured to control the restriction unit and restrict the orientation of the vehicle seat to an orientation in which an occupant protection state is secured by an airbag in the collision direction.

According to the invention (7), in the vehicle control device according to any one of the inventions (1) to (6), when the risk evaluation unit is configured to evaluate that the vehicle travels along a route where side collisions with vehicles are frequent among places where the vehicle travels, the control unit is configured to control the restriction unit and restrict a change to an orientation in which the vehicle seat is directed sideways in a traveling direction of the vehicle.

According to the invention (8), there is provided a vehicle control method including: recognizing, by a computer, information of a traveling environment of a vehicle on the basis of a traveling state of the vehicle; evaluating, by the computer, a risk of a collision which may occur in the vehicle on the basis of the recognized traveling environment; and controlling, by the computer, a restriction unit configured to restrict a change in an orientation of a vehicle seat and restricting the change in the orientation of the vehicle seat on the basis of a level of the evaluated risk of the collision.

According to the invention (9), there is provided a program for causing a computer to: cause information of a traveling environment of a vehicle to be recognized on the basis of a traveling state of the vehicle; cause a risk of a collision which may occur in the vehicle to be evaluated on the basis of the recognized traveling environment; and cause a restriction unit configured to restrict a change in an orientation of a vehicle seat to be controlled and cause the change in the orientation of the vehicle seat to be restricted on the basis of a level of the evaluated risk of the collision.

Advantageous Effects of Invention

According to the inventions (1), (8), and (9), because an orientation of a vehicle seat 10 is restricted on the basis of a level of a risk of a collision which may occur in the vehicle, an occupant protection state of an occupant protection device can be secured and safety can be improved when the risk is high.

According to the invention (2), because an orientation of a vehicle seat is restricted to a direction in which an occupant is reliably protected by the deployment of an airbag when a risk of a collision is high, it is possible to improve the safety of the occupant.

According to the invention (3), it is possible to set an orientation of a vehicle seat according to a risk of a collision evaluated in stages and increase a degree of freedom of a seat arrangement while securing safety.

According to the invention (4), because an orientation of a vehicle seat is restricted when a vehicle travels in a place where a probability of occurrence of a collision is high, it is possible to increase a degree of freedom of a seat arrangement while securing safety.

According to the invention (5), because a direction in which a collision occurs is estimated and an orientation of a vehicle seat is restricted, it is possible to increase a degree of freedom of a seat arrangement while securing safety.

According to the invention (6), because a direction in which a collision occurs is estimated and an orientation of a vehicle seat is restricted to a direction in which an occupant is reliably protected by an airbag, it is possible to improve the occupant's safety.

According to the invention (7), it is possible to improve the safety of occupant protection against a side collision because a route where a collision with a side of a vehicle occurs is estimated and an orientation of a vehicle seat corresponding to the side collision is restricted.

BRIEF DESCRIPTION OF DRAWINGS

FIG. 6 is a diagram showing an example of definition details 200 of road information to be referred to by an information generation unit 45.

FIG. 7 is a diagram showing an example of definition details 201 of real-time information to be referred to by the information generation unit 45.

FIG. 8 is a diagram showing an example of definition details of external recognition information to be referred to by a physical object recognition device 54.

FIG. 9 is a diagram showing an example of definition details of traveling information to be referred to by a traveling state recognition unit 61.

FIG. 10 is an example of information of a traveling environment generated by a traveling environment recognition unit 31.

DESCRIPTION OF EMBODIMENTS

Hereinafter, embodiments of a vehicle control device, a vehicle control method, and a program according to the present invention will be described with reference to the drawings.

Figure 1:
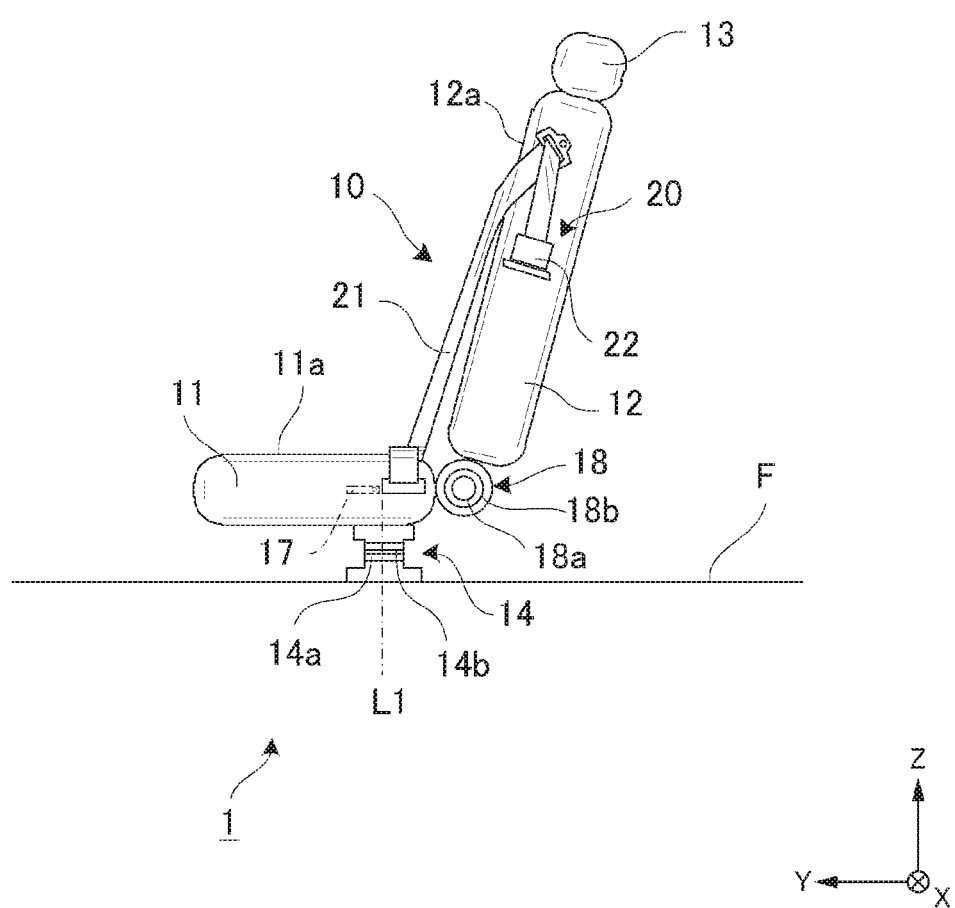
FIG. 1 is a side view showing a configuration of a vehicle seat 10 that is a control target of a vehicle control device 1 of an embodiment.

FIG. 1 is a side view showing a configuration of a vehicle seat 10 that is a control target of a vehicle control device 1 of the embodiment. The vehicle control device 1 includes a vehicle seat 10 and a seat belt device 20. The vehicle seat 10 is a seat on which an occupant of the vehicle M sits and is an electrically controllable seat. The vehicle seat 10 includes a driver seat, a passenger seat, a rear seat, and the like. The seat belt device 20 for protecting an occupant during a collision or the like is provided on one side of the vehicle seat 10.

A vehicle equipped with the vehicle seat 10 (hereinafter referred to as a "vehicle M") is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

The vehicle seat 10 includes, for example, a sitting part 11 and a backrest part 12. In the vehicle seat 10, one end of the sitting part 11 and a lower end of the backrest part 12 are connected by a connection part 18 so that they are rotatable. A headrest 13 is provided at an upper end of the backrest part 12.

The sitting part 11 is a member configured to support a lower body of an occupant. A seat surface 11a on which an occupant D sits is formed on the sitting part 11. The seat surface 11a is formed of a cushioning material. The sitting part 11 is attached to a floor surface F via a rotation connection part 14. The sitting part 11 is disposed rotatable around a rotation axis L1 that is a vertical axis with respect to the floor surface F by means of the rotation connection part 14. The rotation connection part 14 may be rotated manually or may be driven according to electrical control.

Figure 2:
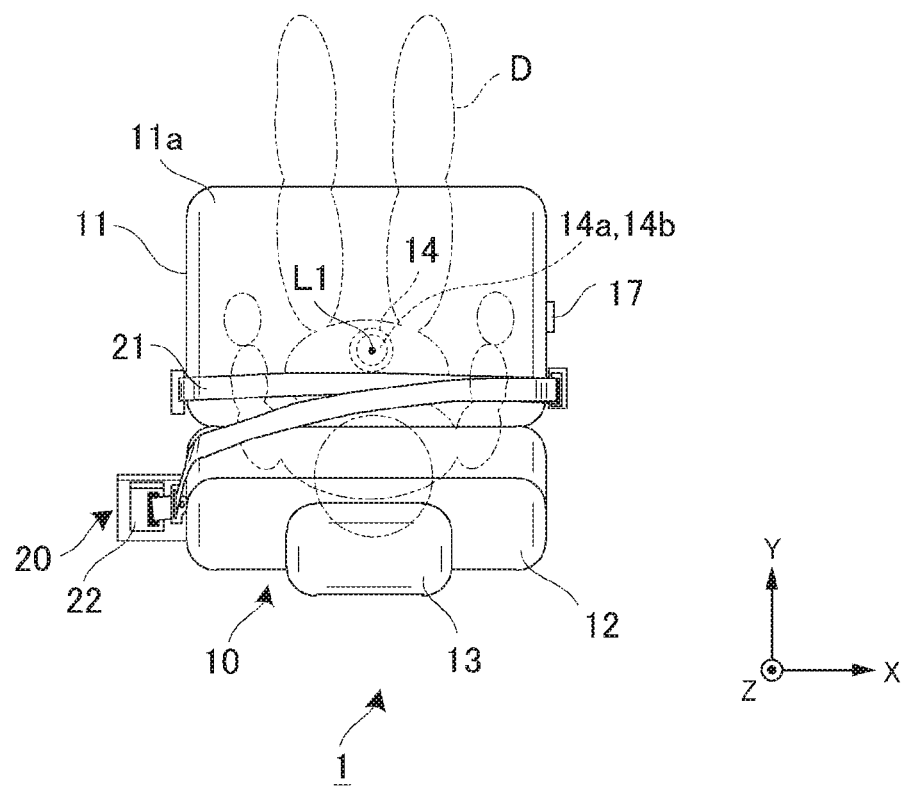
FIG. 2 is a plan view showing a configuration of the vehicle seat 10.
Figure 3:
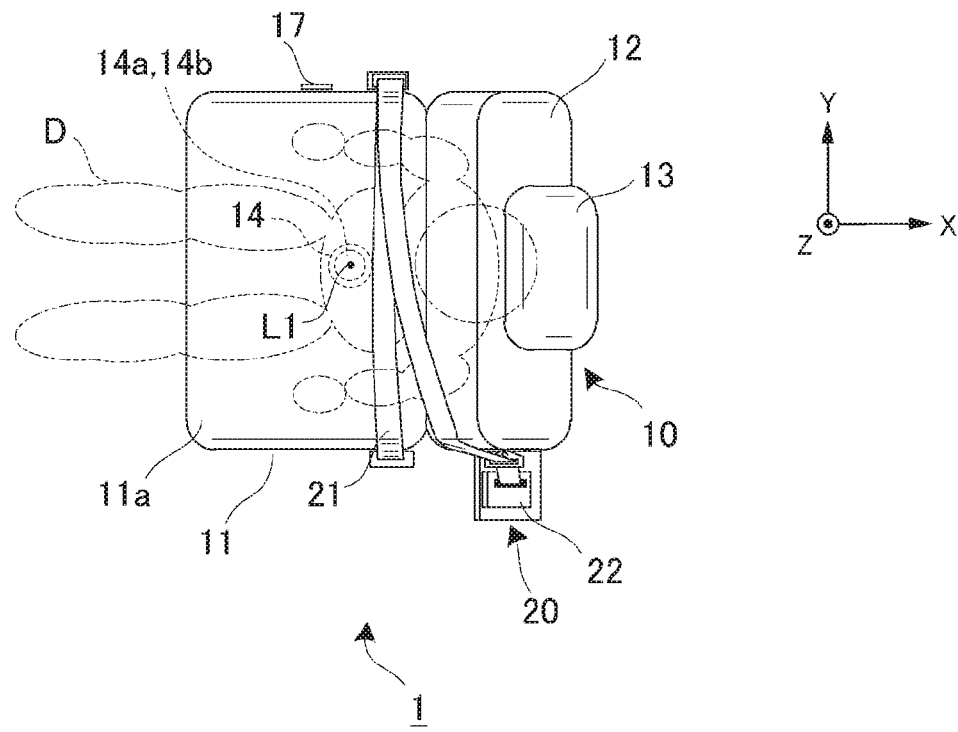
FIG. 3 is a plan view showing a configuration of the vehicle seat 10.

FIGS. 2 and 3 are plan views showing the configuration of the vehicle seat 10. For example, when a rotation operation is performed, the sitting part 11 is fixed to any one of a forward direction (a +Y direction), a rearward direction (a −Y direction), a left direction (a −X direction), and a right direction (a +X direction) in the vehicle M. Alternatively, the sitting part 11 can be fixed at any angle.

The rotation connection part 14 is provided with a first rotation detection unit 14a configured to detect a rotation direction of the sitting part 11 with respect to the floor surface F. The vehicle seat 10 is rotated by the rotation connection part 14 in various directions such as a lateral direction and a rearward direction. The rotation connection part 14 is further provided with a first rotation restriction unit 14b. The control unit 100 to be described below is connected to the first rotation detection unit 14a and the first rotation restriction unit 14b. The first rotation detection unit 14a outputs a detection result to the control unit 100. The first rotation restriction unit 14b restricts the rotation of the rotation connection part 14 according to the control of the control unit 100 as will be described below.

The backrest part 12 is a member configured to support the occupant's torso. As for the backrest part 12, the backrest surface 12a is formed. The backrest surface 12a is formed of a cushioning material. The headrest 13 is provided at the tip of the backrest part 12. The headrest 13 supports the head or neck of the occupant sitting on the sitting part 11. The backrest part 12 can be disposed in a reclined state at a rotation angle with respect to the floor surface F by means of the connection part 18. The connection part 18 has, for example, a rotating hinge structure.

The connection part 18 includes, for example, a biasing means (not shown) such as a rotary spring and biases the backrest part 12 in a direction in which an angle formed between the backrest part 12 and the sitting part 11 is narrowed (the +Y direction). When a lever 17 is released, the backrest part 12 falls in the forward direction (the +Y direction) around the connection part 18 by means of a biasing force of the connection part 18. When the occupant applies a force to the backrest surface 12a in the rearward direction (the −Y direction) in the released state of the lever 17, the backrest part 12 falls in the rearward direction around the connection part 18.

The connection part 18 is further provided with a second rotation detection unit 18a and a second rotation restriction unit 18b. The control unit 100 to be described below is connected to the second rotation detection unit 18a and the second rotation restriction unit 18b. The second rotation detection unit 18a outputs the detection result to the control unit 100. The second rotation restriction unit 18b restricts the rotation of the connection part 18 according to the control of the control unit 100 as will be described below.

The seat belt device 20 is attached to one side of both side surfaces of the backrest part 12. Although the position of the seat belt device 20 is determined according to either the right side or the left side on which the vehicle seat 10 is provided in a traveling direction of the vehicle M, the present invention is not limited thereto. The position of the seat belt device 20 may be appropriately changed. The seat belt device 20 may be incorporated into the backrest part 12.

The seat belt device 20 is a three-point seat belt and includes a belt (a seat belt) 21 and a winding device 22. In an accommodated state, the belt 21 is accommodated within the winding device 22 in a wound state. An accommodation space (not shown) in which the belt 21 is accommodated in a wound state is formed in the winding device 22.

The winding device 22 includes a biasing means (not shown) such as a rotary spring for winding the belt 21. The belt 21 is biased in a winding direction by the biasing means. When an occupant D fastens the belt 21, the belt 21 is maintained in a tension state by means of the biasing means of the winding device 22 and the slackness of the belt 21 is reduced.

The occupant D pulls out the belt 21 from the winding device 22 and binds himself/herself to the vehicle seat 10. At this time, the belt 21 binds the abdomen of the occupant D in the horizontal direction with respect to the vehicle seat 10 and also binds the upper body of the occupant D by laying the belt 21 diagonally across his/her upper body. The winding device 22 mechanically locks the pulling out of the belt 21 and restrains the occupant D to the vehicle seat 10 when prescribed acceleration or more is applied.

Figure 4:
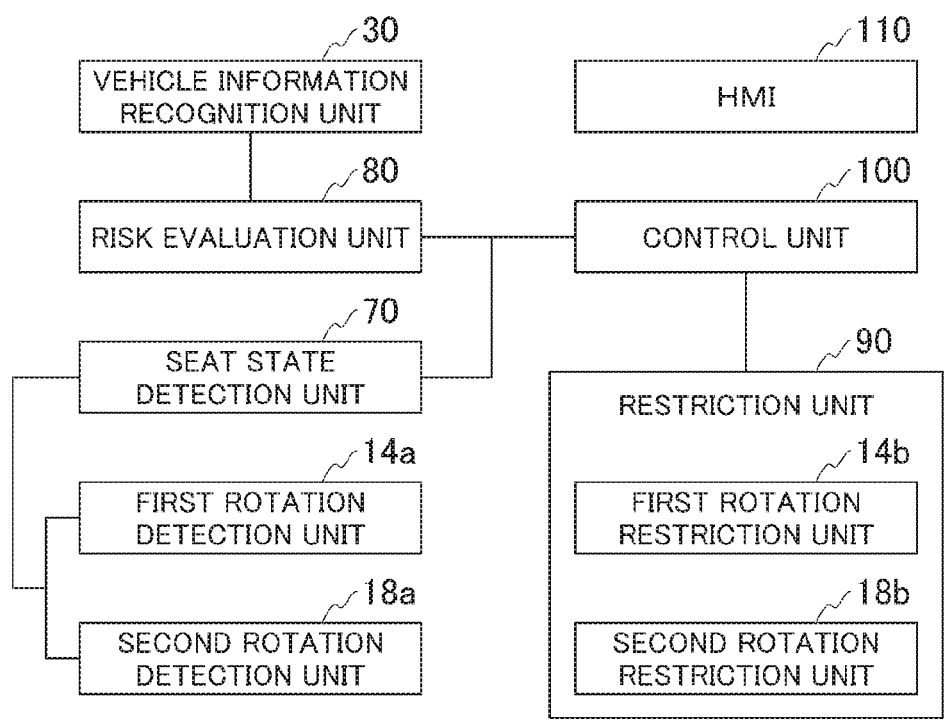
FIG. 4 is a block diagram showing a configuration of the vehicle control device 1.

FIG. 4 is a block diagram showing the configuration of the vehicle control device 1. The vehicle control device 1 includes a vehicle information recognition unit 30, a risk evaluation unit 80, a seat state detection unit 70, a restriction unit 90, a control unit 100, and an HMI (a display unit) 110. The vehicle information recognition unit 30 detects information of a traveling environment of the vehicle on the basis of the traveling state of the vehicle. The vehicle information recognition unit 30 will be described in detail below. The risk evaluation unit 80 evaluates the risk of a collision which may occur in the vehicle M on the basis of the traveling environment recognized by the vehicle information recognition unit 30. The risk evaluation unit 80 will be described in detail below.

The seat state detection unit 70 detects the orientation of the vehicle seat 10. The orientation described herein refers to a rotation direction (a seat direction) around the rotation axis L1 of the vehicle seat 10 or a state of a seat arrangement of the vehicle seat 10 based on an angle (a reclining angle) between the backrest part 12 and the floor surface F. The seat state detection unit 70 is connected to the first rotation detection unit 14a provided in the rotation connection part 14 of the vehicle seat 10 and detects the rotation direction of the vehicle seat 10. Also, the seat state detection unit 70 is connected to the second rotation detection unit 18a provided in the connection part 18 of the vehicle seat 10 and detects the reclining angle of the backrest part 12.

The restriction unit 90 restricts a change in the orientation of the vehicle seat 10. The restriction unit 90 is connected to the first rotation restriction unit 14b provided in the rotation connection part 14 of the vehicle seat 10, and restricts the rotation of the vehicle seat 10. Also, the restriction unit 90 is connected to the second rotation restriction unit 18b provided in the connection part 18 of the vehicle seat 10 and restricts the reclining rotation angle of the backrest part 12. The control unit 100 controls the restriction unit 90 and restricts the change in the orientation of the vehicle seat 10 on the basis of a level of the risk of a collision evaluated by the risk evaluation unit 80.

The HMI 110 is a display unit configured to present various types of information to the occupant within the vehicle and receive input operations from the occupant. The HMI 110 includes, for example, various types of display devices, speakers, buzzers, touch panels, various types of operation switches, keys, and the like.

Each of the vehicle information recognition unit 30, the risk evaluation unit 80, and the control unit 100 is implemented by a processor such as a central processing unit (CPU) executing a program (software). Also, some or all of the functional units of the vehicle information recognition unit 30, the risk evaluation unit 80, and the control unit 100 to be described below may be implemented by hardware such as large scale integration (LSI), an application specific integrated circuit (ASIC), or a field-programmable gate array (FPGA) or may be implemented by cooperation between software and hardware.

Figure 5:
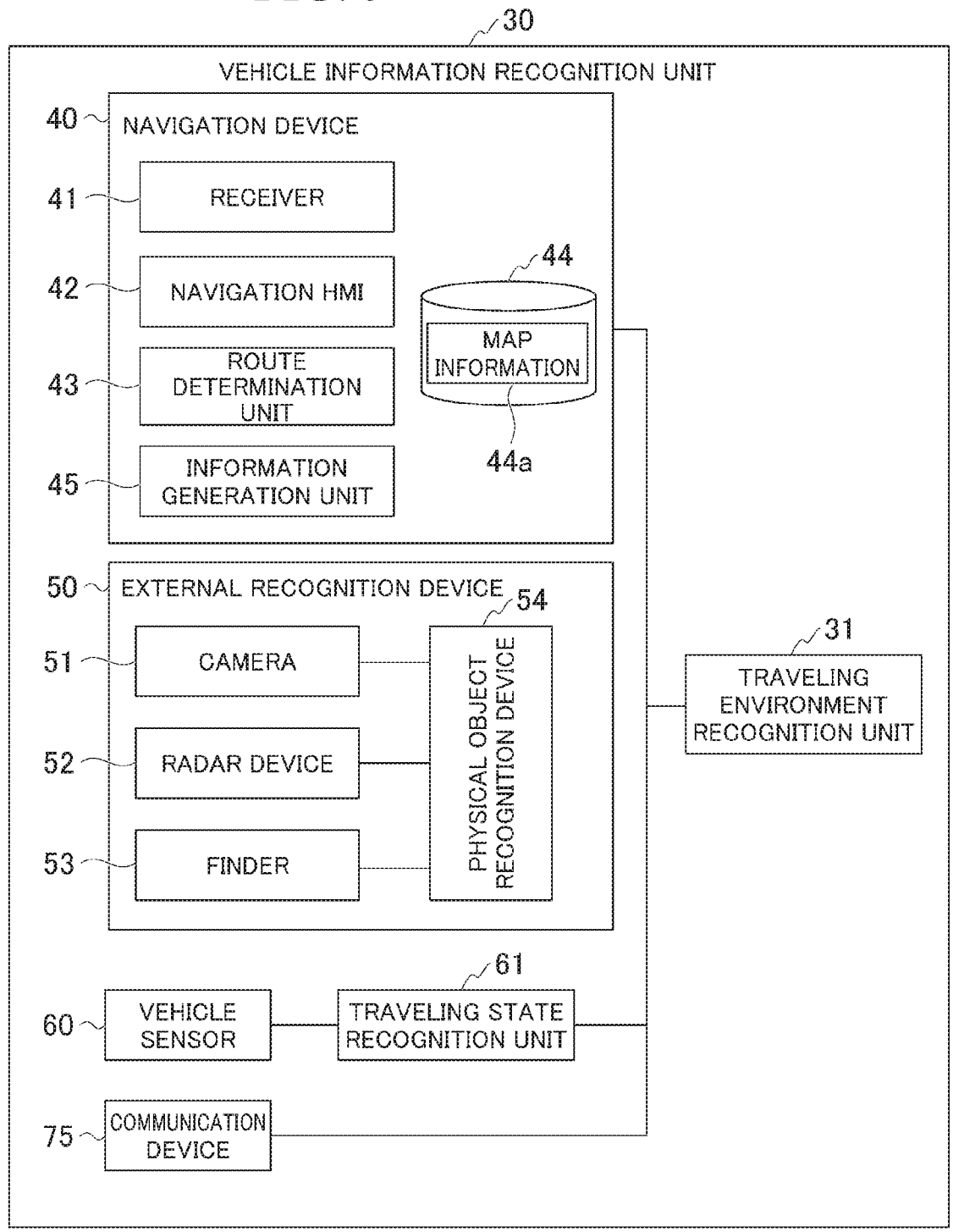
FIG. 5 is a diagram showing an example of the configuration of a vehicle information recognition unit 30.

Hereinafter, the vehicle information recognition unit 30 will be described. FIG. 5 is a diagram showing an example of the configuration of the vehicle information recognition unit 30. The vehicle information recognition unit 30 includes, for example, a traveling environment recognition unit 31, a navigation device 40, an external recognition device 50, a vehicle sensor 60, a traveling state recognition unit 61, and a communication device 75.

The navigation device 40 performs route guidance in accordance with a route along which the vehicle M travels to a destination. For example, the navigation device 40 includes a global navigation satellite system (GNSS) receiver 41, a navigation HMI 42, a route determination unit 43, and an information generation unit 45 and stores map information 44a in a storage device such as a hard disk drive (HDD) or a flash memory. The GNSS receiver 41 identifies a position of the vehicle M on the basis of a signal received from a GNSS satellite. The position of the vehicle M may be identified or supplemented by an inertial navigation system (INS) using an output of the vehicle sensor 60.

The navigation HMI 42 includes a display device, a speaker, a touch panel, keys, and the like. The navigation HMI 42 may be partly or wholly shared with the above-described HMI 110. For example, the route determination unit 43 determines a route (including information about a via-point when the vehicle travels) from the position of the vehicle M identified by the GNSS receiver 41 (or any input position) to a destination input by the occupant by using the navigation HMI 42 with reference to the map information 44a. The map information 44a is, for example, information in which a road shape is expressed by a link indicating a road and nodes connected by a link. The map information 44a may include a curvature of a road, point of interest (POI) information, and the like.

The map information 44*a* is map information which has higher accuracy. For example, the map information 44*a* includes information about a center of a lane, information about a boundary of a lane, or the like. Also, the map information 44*a* may include road information, traffic accident information, road traffic information, a hazard map, weather information, address information (an address/zip code), facility information, telephone number information, and the like. The road information includes information indicating types of road and areas such as urban areas, residential areas, expressways, toll roads, national highways, and prefectural roads, information about the number of lanes on a road, a region of an emergency parking zone, the width of each lane, the gradient of a road, the position of a road (three-dimensional coordinates including longitude, latitude, and height), the curvature of a curve of a lane, positions of merging and branching points of lanes, signs provided on a road, and the like.

The map information 44*a* may be updated at any time by accessing the communication network using the communication device 75. Further, information related to road traffic of a net user acquired via the communication network may be added to the map information 44*a*. The navigation HMI 42 may display additional information such as road information, road traffic information, weather information, real-time information including a hazard map, and the like in a traveling route.

The navigation device 40 may perform route guidance using the navigation HMI 42 on the basis of the route determined by the route determination unit 43. Also, for example, the navigation device 40 may be implemented by the function of a terminal device such as a smartphone and a tablet terminal held by a user. Also, the navigation device 40 may transmit the current position and the destination to the navigation server via the communication device 75 and acquire the route returned from the navigation server.

The information generation unit 45 generates information associated with the route determined by the route determination unit 43. The information generation unit 45 generates road information on the basis of the map information 44*a* and the map information 44*a*. Also, the information generation unit 45 generates real-time information on the basis of information collected using the communication device 75.

FIG. 6 is a diagram showing an example of definition details 200 of the road information to be referred to by the information generation unit 45. In the definition details 200 of the road information, items related to roads are defined in advance. In the definition details 200 of the road information, for example, items of a type of road, the number of lanes, road linearity, a gradient, and a place are set and further subdivided data is set for each item.

The information generation unit 45 generates road information related to a road for each prescribed section of the route along which the vehicle M travels in accordance with the classification of the definition details 200. The prescribed section is defined as, for example, a section in which a route along which the vehicle M travels is divided for each fixed distance. The prescribed section may be defined as a section of a fixed distance in which the vehicle M will travel in the future from a current position.

The information generation unit 45 selects pieces of data one by one from items such as a type of road, the number of lanes, road linearity, a gradient, and a place and connects the selected data to generate road information. The generated road information is, for example, "general road+2 lanes+straight line+gradient (1)+urban area".

FIG. 7 is a diagram showing an example of definition details 201 of real-time information to be referred to by the information generation unit 45. In the definition details 201 of the real-time information, items related to a hazard map indicating information that changes in real time while the vehicle M is traveling and information related to the hazard of a place where the vehicle M is traveling are defined in advance.

For example, items of road traffic information, a hazard map, and weather information are set in the definition details 201 of the real-time information and subdivided data is further set for each item. The information generation unit 45 generates real-time information in a prescribed section of a route along which the vehicle M travels in accordance with the classification of the definition details 201 of the real-time information set in advance.

The information generation unit 45 selects pieces of data one by one from items such as road traffic information, a hazard map, and weather information and connects the selected data to generate real-time information. The generated real-time information is, for example, "congestion+vehicle accident+rain". The road information and real-time information generated by the information generation unit 45 are output to the traveling environment recognition unit 31. The function of the information generation unit 45 may be integrated into the traveling environment recognition unit 31.

The external recognition device 50 recognizes a physical object around the vehicle M. The external recognition device 50 includes, for example, a camera 51, a radar device 52, a finder 53, and a physical object recognition device 54. For example, the camera 51 is a digital camera using a solid-state imaging device such as a charge coupled device (CCD) or a complementary metal oxide semiconductor (CMOS). The camera 51 is attached to any one or more positions on the vehicle M on which the camera 51 is mounted.

When the view in front thereof is imaged, the camera 51 is attached to an upper part of a front windshield, a rear surface of a rearview mirror, or the like. When the view to the rear thereof is imaged, the camera 51 is attached to an upper part of a rear windshield, a back door, or the like. When the view to the side thereof is imaged, the camera 51 is attached to a door mirror or the like. For example, the camera 51 periodically and iteratively images the vicinity of the vehicle M. The camera 51 may be a stereo camera.

The radar device 52 radiates radio waves such as millimeter waves around the vehicle M and detects at least a position (a distance to and a direction) of a physical object by detecting radio waves (reflected waves) reflected by the physical object. One or more radar devices 52 are attached to any positions on the vehicle M. The radar device 52 may detect a position and speed of the physical object in a frequency modulated continuous wave (FM-CW) scheme.

The finder 53 is a light detection and ranging or laser imaging detection and ranging (LIDAR) finder in which scattered light from irradiation light is measured and a distance to an object is detected. One or more finders 53 are attached to any positions on the vehicle M.

The physical object recognition device 54 performs a sensor fusion process on detection results from some or all of the camera 51, the radar device 52, and the finder 53 to recognize a position, a type, a speed, and the like of a physical object. The physical object recognition device 54 recognizes states such as a position, a speed, and acceleration of a nearby vehicle on the basis of information input by the camera 51, the radar device 52, and the finder 53.

The position of a nearby vehicle may be indicated by a representative point such as a center of gravity or a corner of the nearby vehicle or may be indicated by a region represented by an outline of the nearby vehicle. Also, the physical object recognition device 54 may recognize the positions of structures, buildings, trees, guardrails and utility poles, parked vehicles, pedestrians, and other physical objects in addition to nearby vehicles. The physical object recognition device 54 generates a result of recognizing the physical object as information.

FIG. 8 is a diagram showing an example of definition details of external recognition information to be referred to by the physical object recognition device 54. In definition details 202 of the external recognition information, representative physical objects recognized by the physical object recognition device 54 are defined in advance. In the definition details 202 of the external recognition information, for example, items of a parked vehicle, a traveling vehicle, a pedestrian, a tree, a building, and a guardrail are set and a field of data to be aggregated for each item is set.

The physical object recognition device 54 generates information of a physical object recognized around the vehicle M in accordance with the classification of the definition details 202 of the external recognition information set in advance. The external recognition information may be, for example, a result of aggregating physical objects recognized within a prescribed section or prescribed time. External recognition information such as a physical object recognized by the physical object recognition device 54 is output to the traveling environment recognition unit 31. The function of the physical object recognition device 54 may be integrated into the traveling environment recognition unit 31.

The vehicle sensor 60 detects information related to the traveling state of the vehicle M. The vehicle sensor 60 includes, for example, a vehicle speed sensor configured to detect a speed of the vehicle M, an acceleration sensor configured to detect acceleration, an angular speed sensor configured to detect an angular speed around three axes of roll, pitch, and yaw of the vehicle M, and a direction sensor configured to detect a direction of the vehicle M. The acceleration sensor may include, for example, a lateral acceleration sensor configured to detect acceleration in a lateral direction of the vehicle M (hereinafter referred to as "lateral acceleration").

Data detected by the vehicle sensor 60 is output to the traveling state recognition unit 61. The traveling state recognition unit 61 recognizes traveling information such as the speed, acceleration, and inclination of the vehicle M on the basis of the data detected by the vehicle sensor 60.

FIG. 9 is a diagram showing an example of definition details of traveling information referred to by the traveling state recognition unit 61. The traveling state recognition unit 61 generates traveling information indicating a traveling state of the vehicle M in accordance with the classification of definition details 203 of the traveling information set in advance. Data based on data output by the vehicle sensor 60 is set in the definition details 203 of the traveling information. In the definition details 203 of the traveling information, items of a traveling state, pitch, roll, and yaw are set and discretized data is further set for each item.

The item of the traveling state is classified as discretized data such as a stop, a low speed, a medium speed, a high speed, acceleration, deceleration, or acceleration/deceleration on the basis of the acceleration data output from the vehicle sensor 60. For the items of pitch, roll, and yaw, data discretized on the basis of a degree of output on the basis of angular speed data output by the vehicle sensor 60 is defined.

The generated traveling information is, for example, "medium speed+pitch 1+roll 0+yaw 0". The traveling information of the vehicle M recognized by the traveling state recognition unit 61 is output to the traveling environment recognition unit 31. The function of the traveling state recognition unit 61 may be integrated into the traveling environment recognition unit 31.

The communication device 75 communicates with a wireless base station or the like using, for example, a cellular network, a Wi-Fi (registered trademark) network, Bluetooth (registered trademark), dedicated short range communication (DSRC), or the like. The communication device 75 is connected to the navigation device 40 and the external recognition device 50. The navigation device 40 and the external recognition device 50 use the communication device 75 to communicate with various server devices of a business operator and the like for providing information such as map information, traffic information, and weather forecasts via the communication network.

A traveling environment recognition unit 31 recognizes a traveling environment of the vehicle M on the basis of information output by the navigation device 40, the external recognition device 50, and the traveling state recognition unit 61. The traveling environment is recognized on the basis of road information, real-time information, external recognition and traveling information of a route along which the vehicle M is traveling. The traveling environment recognition unit 31 aggregates the road information, the real-time information, external recognition, and the traveling information to generate information of the traveling environment of the vehicle M.

FIG. 10 is an example of information of a traveling environment generated by the traveling environment recognition unit 31. The traveling environment recognition unit 31 generates information related to the traveling environment of the vehicle M by connecting information collected from the information generation unit 45, the physical object recognition device 54, and the traveling state recognition unit 61. The information related to the traveling environment of the vehicle M is generated by connecting road information and real-time information generated by the information generation unit 45, external recognition information generated by the physical object recognition device 54, and traveling information generated by the traveling state recognition unit 61.

The traveling environment recognition unit 31 outputs the generated traveling environment information to the risk evaluation unit 80. The risk evaluation unit 80 generates a risk evaluation model on the basis of information of the traveling environment of the vehicle M and evaluates the risk of an accident which may occur in the vehicle M.

The risk evaluation model is a model in which elements constituting information of a driving environment are scored and a weighted parameter differing according to each element score is set on the basis of a risk of occurrence of an accident. For example, in the risk evaluation model, data such as "urban area", "rain", and "vehicle accident" is weighted so that the risk increases. In the risk evaluation model, a combination of data that is complex factors that increase the risk of the occurrence of a collision with the vehicle M such as, for example, "rain", "winding", and "high speed" may be weighted more.

The risk evaluation unit 80 evaluates the risk of a collision that may occur during a prescribed section or time during which the vehicle M travels in stages on the basis of the risk evaluation model. For example, the risk of the collision is evaluated in five stages 1 to 5. For example, the stages of the risk are set by dividing a difference between a maximum value and a minimum value of the risk score into five equal parts. The risk stage may be subdivided into more or less than five stages. The risk evaluation unit 80 outputs an evaluation result of the risk of the collision which may occur in the vehicle M to the control unit 100.

A recommended orientation of the vehicle seat 10 is different on the basis of the stage of the risk of the collision. For example, when the stage of the risk of the collision is high stage "5", the orientation of the vehicle seat 10 in a normal state in which the effect of the airbag to be deployed and the seat belt device 20 is best is recommended. Here, the normal state is a position where a rotation position of the vehicle seat 10 around the rotation axis L1 is a directly-facing position (a position facing forward), and an angle of the backrest part 12 is within a prescribed angle (prescribed reclining or more is not made).

Therefore, the control unit 100 controls the restriction unit 90 and restricts a change in the orientation of the vehicle seat 10 on the basis of the level of the collision risk evaluated by the risk evaluation unit 80. For example, when the risk of the collision is high and when the orientation of the vehicle seat 10 detected by the seat state detection unit 70 is in the normal state, the control unit 100 locks the first rotation restriction unit 14*b* and the second rotation restriction unit 18*b* and prohibits the change in the orientation of the vehicle seat 10. When the risk of the collision is high, the control unit 100 restricts the orientation of the vehicle seat 10 to an orientation in which an occupant protection state is secured by the seat belt device 20 or the airbag.

When the vehicle M starts to travel in a region where the risk of the collision is high and when the seat state detection unit 70 has detected a state in which the vehicle seat 10 has already rotated or a state in which the backrest part 12 has a reclining rotation angle greater than or equal to a prescribed angle, the control unit 100 may cause the HMI 110 to perform a display operation of prompting the occupant to return the orientation of the vehicle seat 10 to the original position. The control unit 100 may cause the HMI 110 to notify the occupant by sound in order to prompt the occupant to return the orientation of the vehicle seat 10 to the original position.

The risk evaluation unit 80 evaluates the risk of the collision on the basis of a place where the vehicle travels on the basis of a traveling environment. Thus, when the vehicle M travels in a region where the risk of the collision is low, the control unit 100 does not control the restriction unit 90 and the occupant can freely arrange the orientation of the vehicle seat 10. For example, because the risk is evaluated to be low when the vehicle M is stopped in a parking lot or the like, the occupant freely rotates the vehicle seat 10 and rotates the backrest part 12 so that a state of a full-flat reclining orientation can be given. Also, the risk evaluation unit 80 may evaluate a direction of a collision which may occur in the vehicle M on the basis of the risk evaluation model.

When the risk evaluation unit 80 evaluates that the vehicle M is traveling along a route where side collisions with vehicles are frequent among places where the vehicle M travels, the control unit 100 may control the restriction unit 90 and restrict a change to an orientation in which the vehicle seat 10 becomes laterally outward in the traveling direction of the vehicle M. In this case, the control unit 100 may lock the first rotation restriction unit 14*b* and the second rotation restriction unit 18*b* and prohibit a change in the orientation of the vehicle seat 10 in a state in which the vehicle seat 10 is in the traveling direction of the vehicle M or in a direction opposite to the traveling direction on the basis of the level of the risk of the collision.

Figure 11:
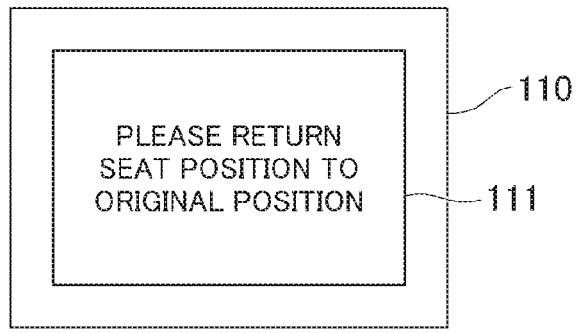
FIG. 11 is a diagram showing an example of a display image 111 displayed on an HMI 110.

FIG. 11 is a diagram showing an example of a display image 111 displayed on the HMI 110. When the orientation of the vehicle seat 10 is returned to the original position after the display image 111 is displayed on the HMI 110, the control unit 100 locks the first rotation restriction unit 14*b* and the second rotation restriction unit 18*b* and prohibits the change in the orientation of the vehicle seat 10.

Figure 12:
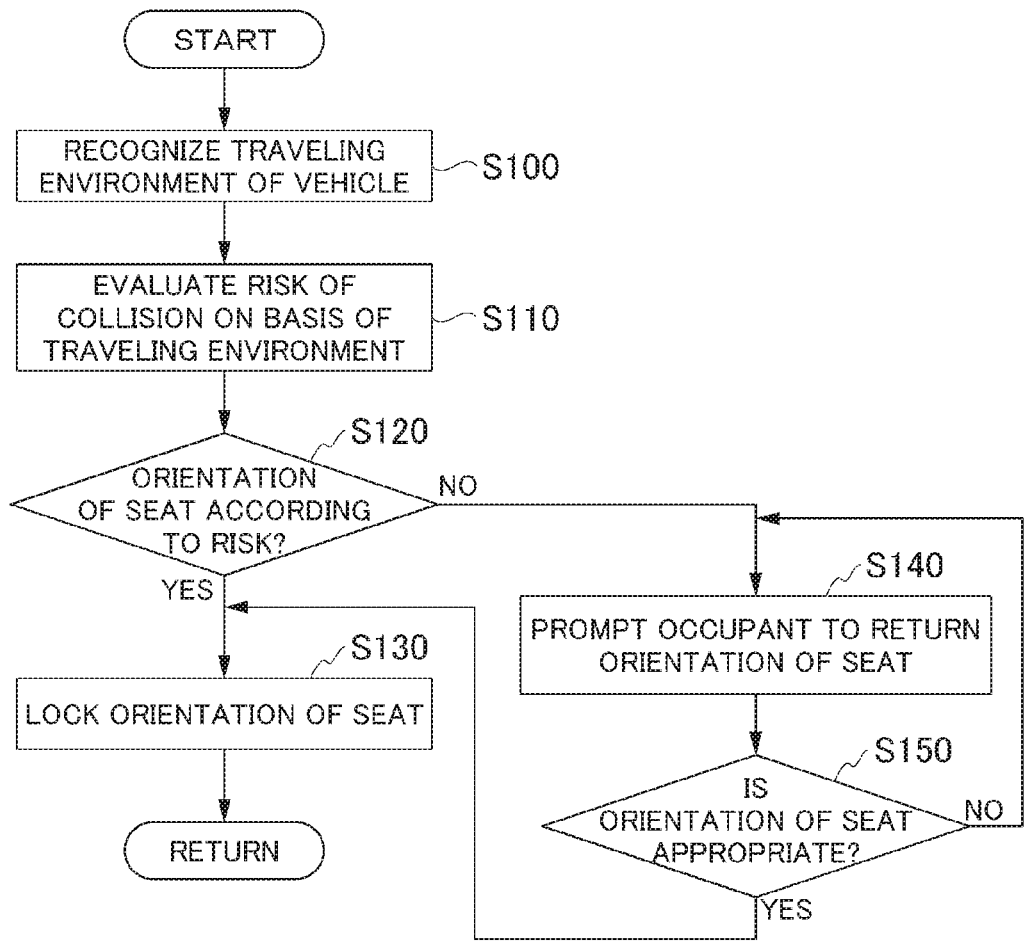
FIG. 12 is a flowchart showing a flow of a process of the vehicle control device 1.

Next, a process of the vehicle control device 1 will be described. FIG. 12 is a flowchart showing a flow of a process of the vehicle control device 1. The vehicle information recognition unit 30 recognizes a traveling environment of the vehicle M on a route along which the vehicle M travels (step S100). The risk evaluation unit 80 evaluates a risk of a collision which may occur in the vehicle M on the basis of the traveling environment recognized by the vehicle information recognition unit 30 (step S110).

The control unit 100 determines whether or not an orientation of the vehicle seat 10 detected by the seat state detection unit 70 is an orientation according to a level of the risk (step S120) and controls the restriction unit 90 and locks a rotation direction of the vehicle seat 10 and a rotation angle of the backrest part 12 when the orientation of the vehicle seat 10 is appropriate (step S130).

In the case of a negative determination in step S120, the control unit 100 controls the HMI 110 and performs an attention drawing operation of prompting the occupant to make the orientation of the vehicle seat 10 appropriate (step S140). After the attention drawing operation, when the seat state detection unit 70 detects that the orientation of the vehicle seat 10 is appropriate (step S150), the control unit 100 controls the restriction unit 90 and locks the rotate direction of the vehicle seat 10 and the rotation angle of the backrest part 12 (step S130).

Figure 13:
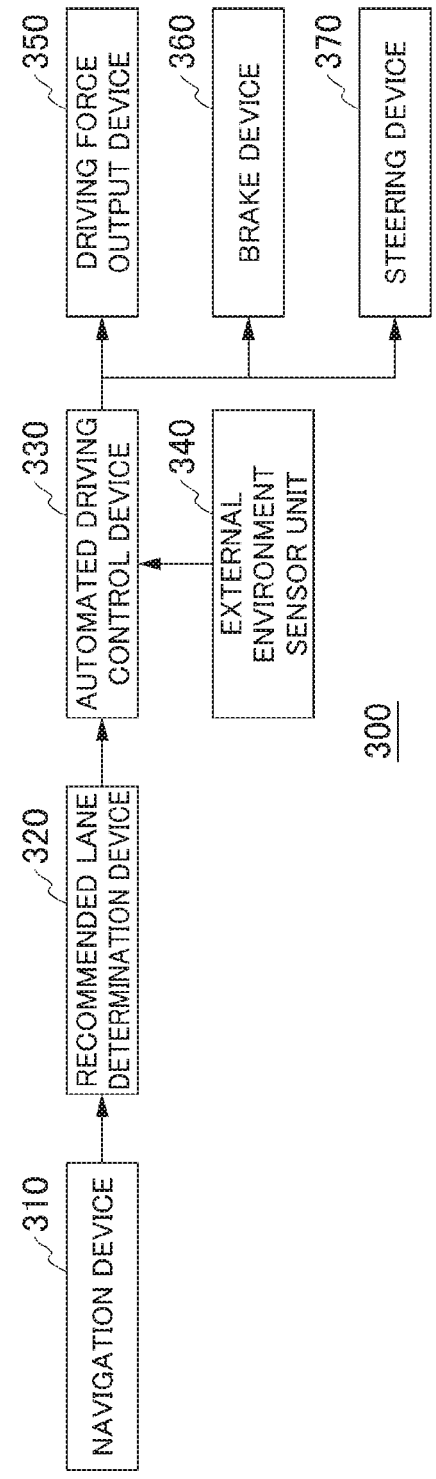
FIG. 13 is a configuration diagram when the vehicle control device 1 is applied to an automated driving vehicle 300.

The vehicle control device 1 described above may be applied to the automated driving vehicle 300. FIG. 13 is a configuration diagram when the vehicle control device 1 is applied to the automated driving vehicle 300. The navigation device 310 outputs a route to a destination to the recommended lane determination device 320. The recommended lane determination device 320 refers to a map that is more detailed than map data provided in the navigation device 310, determines a recommended lane in which the vehicle travels, and outputs a determination result to the automated driving control device 330. The automated driving control device 330 may include the vehicle control device 1 described above or may be separate therefrom.

The automated driving control device 330 controls some or all of the driving force output device 350 including the engine and motor, the brake device 360, and the steering device 370 so that the vehicle travels in the recommended lane input from the recommended lane determination device 320 on the basis of information input from the external environment sensor unit 340 including a camera, a radar device, a light detection and ranging or laser imaging detection and ranging (LIDAR) finder, a physical object recognition device, and the like.

In such an automated driving vehicle 300, it is assumed that an occupant gets into the automated driving vehicle 300 in a free seat arrangement as compared with a manually driven vehicle. Therefore, it is necessary to effectively operate the existing occupant protection device against an unexpected collision. By using the vehicle control device 1 of the embodiment, the safety of protection of the occupant D can be improved.

As described above, the vehicle control device 1 can improve the safety of the occupant protection using an occupant protection device such as an airbag by restricting an orientation of the vehicle seat 10 on the basis of a level of a risk of a collision which may occur on a route along which the vehicle M travels. Furthermore, the vehicle control device 1 can prevent the orientation of the vehicle seat 10 from being inappropriate in a collision direction and improve the safety of the occupant protection using the occupant protection device by predicting the collision direction related to the vehicle M.

Although modes for carrying out the present invention have been described using embodiments, the present invention are not limited to the embodiments, and various modifications and substitutions can also be made without departing from the scope and spirit of the present invention.

REFERENCE SIGNS LIST

1 Vehicle control device
10 Vehicle seat
11 Sitting part
11a Seat surface
12 Backrest part
12a Backrest surface
13 Headrest
14 Rotation connection part
14a First rotation detection unit
14b First rotation restriction unit
17 Lever
18 Connection part
18a Second rotation detection unit
18b Second rotation restriction unit
20 Seat belt device
21 Belt
22 Winding device
30 Vehicle information recognition unit
31 Traveling environment recognition unit
40 Navigation device
41 Receiver
42 Navigation HMI
43 Route determination unit
44 Storage device
44a Map information
45 Information generation unit
50 External recognition device
51 Camera
52 Radar device
53 Finder
54 Physical object recognition device
60 Vehicle sensor
61 Traveling state recognition unit
70 Seat state detection unit
75 Communication device
80 Risk evaluation unit
90 Restriction unit
100 Control unit
110 HMI
300 Automated driving vehicle
310 Navigation device
320 Recommended lane determination device
330 Automated driving control device
340 External environment sensor unit
350 Driving force output device
360 Brake device
370 Steering device
M Vehicle

What is claimed is:

1. A vehicle control device comprising:
a restriction unit configured to restrict a change in an orientation of a vehicle seat;
a vehicle information recognition unit configured to recognize an external recognition information of a vehicle;
a storage device configured to store a map information which includes a road traffic information;
an information generation unit configured to generate a road information on the basis of the map information;
a traveling environment recognition unit configured to connect the road information and the external recognition information, and to generate an information related to a traveling environment of the vehicle;
a risk evaluation unit configured to evaluate a risk of a collision which may occur in the vehicle on the basis of the information related to the traveling environment of the vehicle;
a control unit configured to control the restriction unit and restrict the change in the orientation of the vehicle seat on the basis of a level of the risk of the collision evaluated by the risk evaluation unit,
wherein the control unit is further configured to:
prohibit the change in the orientation of the vehicle seat, in a case when the vehicle is traveling in a region with a high risk of collision determined by the risk evaluation unit and a seat position is a normal state of facing the front of the vehicle, and
perform a display operation of prompting an occupant or notify to return the orientation of the vehicle seat to an original position, in a case when the vehicle starts to travel in a region with a high risk of the collision and the seat position is in a state in which a backrest part has a reclining rotation angle greater than or equal to a prescribe angle.

2. The vehicle control device according to claim 1, wherein the control unit is configured to restrict the orientation of the vehicle seat to an orientation in which an occupant protection state is secured by an airbag when the risk of the collision is high.

3. The vehicle control device according to claim 1, wherein the risk evaluation unit is configured to evaluate the risk of the collision in stages on the basis of the traveling environment, and
wherein the control unit is configured to restrict the change in the orientation of the vehicle seat on the basis of a stage of the risk of the collision.

4. The vehicle control device according to claim 1, wherein the risk evaluation unit is configured to evaluate the risk of the collision on the basis of a place where the vehicle travels.

5. The vehicle control device according to claim 4, wherein the risk evaluation unit is configured to estimate a direction of the collision which may occur in the vehicle on the basis of the traveling environment, and
wherein the control unit is configured to control the restriction unit and restrict the change in the orientation of the vehicle seat on the basis of the collision direction.

6. The vehicle control device according to claim 5, wherein the control unit is configured to control the restriction unit and restrict the orientation of the vehicle seat to an orientation in which an occupant protection state is secured by an airbag in the collision direction.

7. The vehicle control device according to claim 1, wherein, when the risk evaluation unit is configured to evaluate that the vehicle travels along a route where side collisions with vehicles are frequent among places where the vehicle travels, the control unit is configured to control the restriction unit and restrict a change to an orientation in which the vehicle seat is directed sideways in a traveling direction of the vehicle.

8. A vehicle control method using an in-vehicle computer, the vehicle control method comprising:
- storing a map information which includes a road traffic condition;
- recognizing an external recognition information of a vehicle on the basis of a traveling state of the vehicle;
- generating a road information on the basis of the map information;
- connecting the road information and the external recognition information;
- generating an information related to a traveling environment of the vehicle;
- evaluating, a risk of a collision which may occur in the vehicle on the basis of the information related to the traveling environment of the vehicle;
- controlling a restriction unit configured to restrict a change in an orientation of a vehicle seat and restricting the change in the orientation of the vehicle seat on the basis of a level of the evaluated risk of the collision;
- prohibiting the change in the orientation of the vehicle seat, in a case when the vehicle is traveling in an region with a high risk of collision, and a seat position is a normal state of facing the front in the vehicle; and
- performing a display operation of prompting an occupant or notify to return the orientation of the vehicle seat to an original position, in a case when the vehicle starts to travel in a region with the high risk of the collision and the seat position is in a state in which a backrest part has a reclining rotation angle greater than or equal to a prescribed angle.

9. A non-transitory computer-readable recording medium for causing a computer to:
- cause a map information which includes a road traffic information to be stored;
- cause an external recognition information of a vehicle to be recognized on the basis of a traveling state of the vehicle;
- cause a road information to be generated on the basis of the map information;
- cause the road information and the external recognition information to be connected,
- cause an information related to the traveling environment of the vehicle to be generated;
- cause a risk of a collision which may occur in the vehicle to be evaluated based on information related to the traveling environment of the vehicle;
- cause a restriction unit configured to restrict a change in an orientation of a vehicle seat to be controlled and cause the change in the orientation of the vehicle seat to be restricted on the basis of a level of the evaluated risk of the collision;
- cause the change in the orientation of the vehicle seat to be prohibited, in a case where the vehicle is traveling in an region with a high risk of collision, and a seat position is a normal state of facing the front in the vehicle; and
- cause a display operation of prompting an occupant to be performed or to be notified to return the orientation of the vehicle seat to an original position, in a case where the vehicle starts to travel in a region with the high risk of the collision and the seat position is in a state in which a backrest part has a reclining rotation angle greater than or equal to a prescribed angle.

* * * * *